United States Patent [19]
Ellis et al.

[11] Patent Number: 4,725,125
[45] Date of Patent: Feb. 16, 1988

[54] HEAD-UP DISPLAYS

[75] Inventors: Stafford M. Ellis, East Preston; Anthony C. Mundy, Cuxton, both of United Kingdom

[73] Assignee: GEC Avionics Limited, England

[21] Appl. No.: 892,034

[22] Filed: Aug. 1, 1986

[30] Foreign Application Priority Data

Aug. 27, 1985 [GB] United Kingdom ............... 8521307
Sep. 4, 1985 [GB] United Kingdom ............... 8521989

[51] Int. Cl.$^4$ ............................................. G02B 27/14
[52] U.S. Cl. .................................................... 350/174
[58] Field of Search ....................................... 350/174

[56] References Cited

U.S. PATENT DOCUMENTS

| 3,503,146 | 3/1970 | Woplin | 350/174 |
| 3,511,465 | 5/1970 | Morion | 350/174 |
| 3,552,828 | 1/1971 | Lawrence et al. | 350/174 |
| 3,620,601 | 11/1971 | Waghorn et al. | 350/174 |
| 4,225,215 | 9/1980 | Cojan | 350/174 |

FOREIGN PATENT DOCUMENTS

| 1131293 | 10/1968 | United Kingdom | 350/174 |
| 1349071 | 3/1974 | United Kingdom | 350/174 |

Primary Examiner—Jon W. Henry
Attorney, Agent, or Firm—Kirschstein, Kirschstein, Ottinger & Israel

[57] ABSTRACT

A display head (11) for a vehicle head-up display system wherein the display head combiner (35, 37) is pivotally supported by means of two kinematic chains (19, 21, 23, 23', 25, 25') so as to enable the combiner (35, 37) to be moved from an operative position to a stowed position in which the combiner (35, 37) together with its support means (19, 21, 23, 23', 25, 25') is inconspicuous.

6 Claims, 7 Drawing Figures

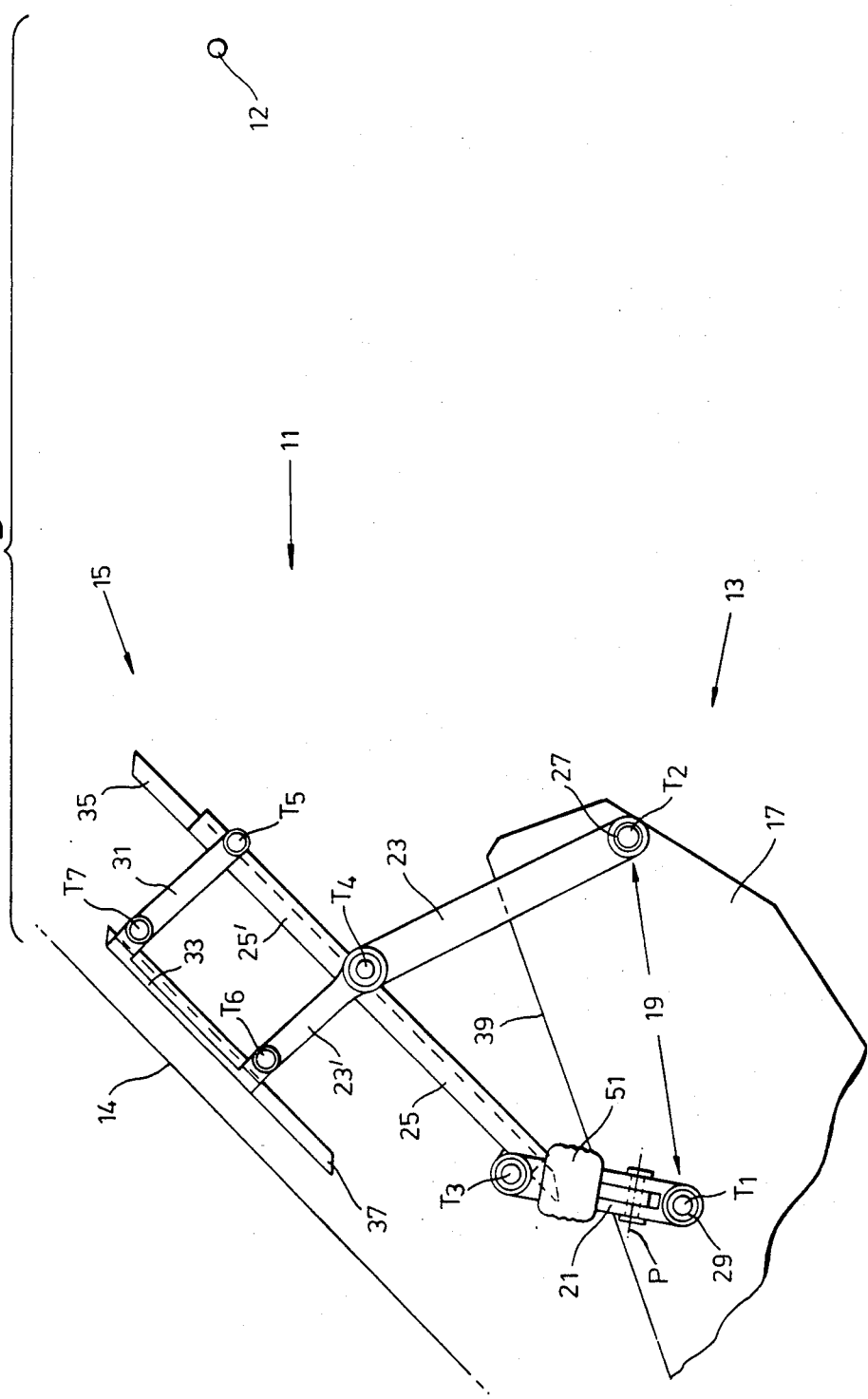

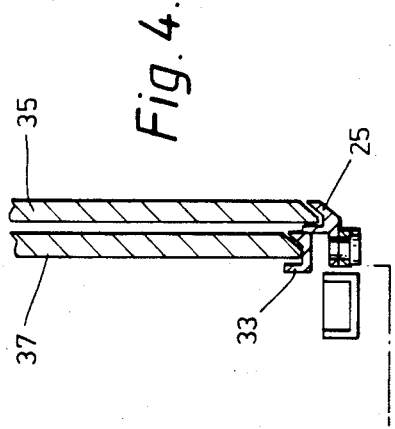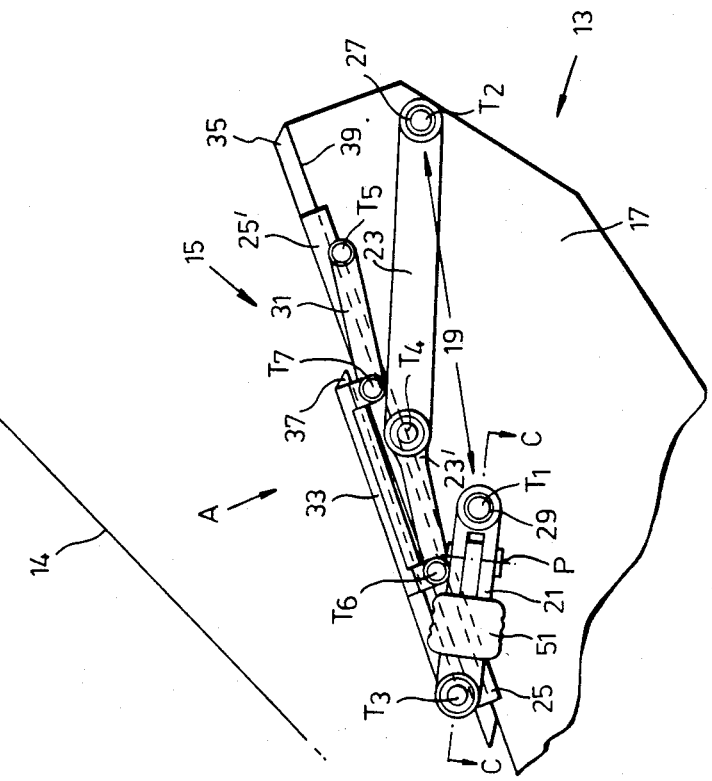

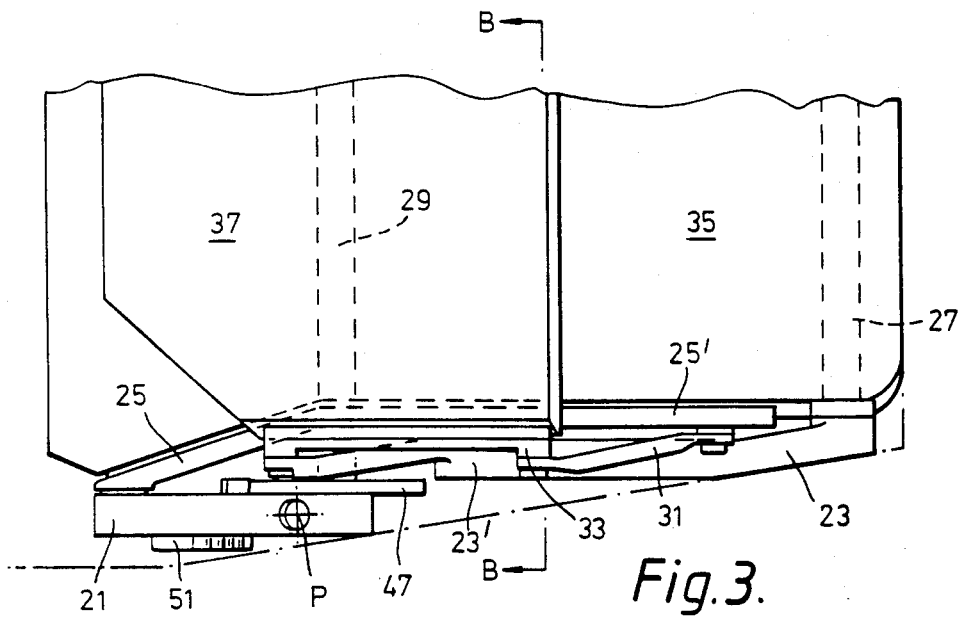
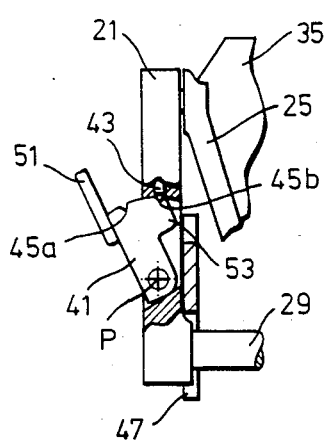
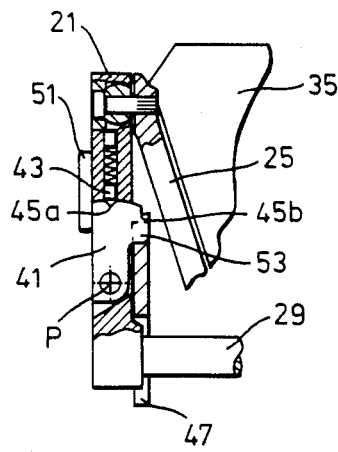
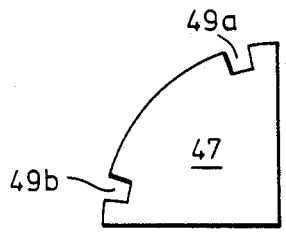

HEAD-UP DISPLAYS

BACKGROUND OF THE INVENTION

1. Field of the Invention

This invention relates to display heads for head-up display systems suitable for use in vehicles, especially aircraft.

More particularly the invention relates to such display heads comprising an optical projector; an image combiner and means for supporting the image combiner so that the combiner is moveable between a stowed and an operative position wherein the optical projector projects light representing a display onto the image combiner for reflection thereby to provide a user with an image of the display superimposed on a view of the scene through the combiner.

2. Description of the Related Art

When used in certain environments, for example, a transport aircraft cockpit, it is desirable that the combiner and its support means should be inconspicuous and not obtrude substantially into the user's view of the scene when the combiner is in its stowed position and it is an object of the present invention to provide a head-up display system display head which achieves this.

SUMMARY OF THE INVENTION

According to the present invention there is provided a display head, for a head-up display system, comprising: an optical projector, an image combiner and means for supporting the image combiner so that the combiner is moveable between a stowed position and an operative position wherein the optical projector projects light representing a display onto the image combiner for reflection thereby to provide a user with an image of the display superimposed on a view of a scene through the combiner in a given viewing direction wherein said support means comprises two substantially identical four element kinematio chains spaced apart in a direction transverse to said viewing direction, each chain comprising a first element fixed with respect to said optical projector, second and third elements pivotally connected to said first element respectively at fore and aft positions with respect to said viewing direction, and a fourth element pivotally connected to said second and third elements at fore and aft positions with respect to said viewing direction and which carries at least part of said combiner, the arrangement being such that each pair of corresponding pivotal axes in the said two chains share a respective common axis and on movement from the operative position to the stowed position said combiner and said elements become more nearly parallel to each other.

Preferably said first elements are fixed to a housing for said optical projector and said fourth elements are fixed to at least part of said combiner so that in the stowed position said combiner and said elements lie alongside a surface of said housing.

Preferably also in each kinematic chain the distance along the first element between the pivotal connections between the second and third elements and the first element is greater than the distance along fourth element between the pivotal connections between the second and third elements and the fourth element, and in each kinematic chain the distance along the second element between the pivotal connections between the second element and the first and fourth elements is greater than the distance along the third elements between the pivotal connections between the third element and the first and fourth elements.

The support means may also include tie means rigidly connected between and to the said kinematic chains.

In such a case the tie means may comprise at least one torsionally stiff spindle, each said spindle extending co-axially with a respective said common axis between the said second and first or between the said third and first elements.

In one particular embodiment of the invention, in respect of each said chain said fourth element has a first rigid extension, said third element has a second rigid extension and said support means further includes a first further element pivotally connected to said first rigid extension and a second further element pivotally connected to said second rigid extension, said first further element and said second further element being also pivotally connected to each other so that said first and second rigid extensions and said first and second further elements together form a parallel motion linkage pivotally connected to said chain at the pivotal connection between said fourth and third elements; and wherein said second further elements carry a further part of said combiner.

BRIEF DESCRIPTION OF THE DRAWINGS

One display head in accordance with the invention for use in an aircraft will now be described, by way of example, with reference to the accompanying drawings in which:

FIG. 1 is a side view of the display head with an image combiner arrangement of the head in an operative position;

FIG. 2 is a side view of the display head with the image combiner arrangement in a stowed position;

FIG. 3 is a projection of the display head in the direction A—A in FIG. 2;

FIG. 4 is a part section on the line B—B in FIG. 3;

FIGS. 5 and 6 are part sections on the line C—C in FIG. 2; and

FIG. 7 is a detail.

DETAILED DESCRIPTION OF THE PREFERRED EMBODIMENTS

Referring to FIG. 1, the display head 11 comprises an optical projector 13 and an image combiner arrangement 15. The image combiner arrangement 15 comprises an image combiner comprising two combiner plate members 35 and 37 and means for supporting the image combiner plates 35, 37 with respect to the optical projector 13.

The support means enables the combiner members 35, 37 to be moved between an operative position shown in FIG. 1, in which the two members 35 and 37 are positioned above the optical projector 13 in spaced parallel relationship on and inclined to the line of sight of a user through the aircraft windshield 14 from a design eye position 12, and a stowed position, shown in FIG. 2, wherein the combiner plates 35, 37 and the support means lie alongside the optical projector 13.

The optical projector 13 comprises a housing 17 and, within the housing, a cathode ray tube (not shown) and a collimating optical system (not shown) typically comprising a so-called relay lens of the Petzval type. Reference may be made to United Kingdom Patent Application No. 2163869-A and U.S. patent application Ser.

No. 763,965 for a description of a projector and image combiner suitable for use in the display head 11.

With the combiner plates 35, 37 in the operative position the cathode ray tube projects light representing a display via the collimating optical system onto the image combiner plates 35, 37 for reflection thereby to provide the user with an image of the display superimposed on the view of a scene through the aircraft windshield 14.

The support means for the image combiner members has two identical four bar kinematic chains disposed one on each side of the housing 17. Each chain comprises a first element in the form of a bottom link 19 constituted by a side wall of the housing 17, second and third elements in the form of collapsible struts 21, 23 and a fourth element in the form of a top link 25. The struts 21, 23 of each chain are pivotally connected to the bottom link 19 at fore and aft transverse axes $T_1$, $T_2$ respectively spaced apart in the user's viewing direction when the combiner is operative. The top link 25 of each chain is pivotally connected to the struts 21, 23 at fore and aft spaced transverse axes $T_3$, $T_4$ respectively spaced from the axes $T_1$ and $T_2$ respectively. The spacing between $T_1$ and $T_2$ is greater than the spacing between $T_3$ and $T_4$. The spacing between $T_2$ and $T_4$ is greater than the spacing between $T_1$ and $T_3$. Torsionally stiff spindles 27, 29 rigidly connect the struts 23, 21 respectively of each of the two chains. The spindle 27 extends co-axial with the transverse axis $T_2$ and the spindle 29 extends co-axial with the transverse axis $T_1$.

The top link 25 and the strut 23 of each chain have first and second rigid extensions 25', 23' respectively, from their mutual pivotal connection at the transverse axis $T_4$. Pivotally connected to the rigid extension 25' of each chain at a transverse axis $T_5$ is a first further element 31, the transverse axis $T_5$ being spaced apart from the transverse axis $T_4$. Pivotally connected to the rigid extension 23' of each chain at a transverse axis $T_6$ there is a second further element 33, the transverse axis $T_6$ being spaced apart from the transverse axis $T_4$. In each chain the second further link element 33 is also pivotally connected to the first further link element 31 at a transverse axis $T_7$, the transverse axis $T_7$ being spaced apart from the transverse axes $T_5$ and $T_6$. The configuration of pivotal connections about the transverse axes $T_4$, $T_5$, $T_6$ and $T_7$ as described above constitutes a parallel motion linkage.

Referring now particularly to FIG. 1 and FIG. 4, the top links 25 with their extensions 25', and the second further link elements 33 support the image combiner members 35 and 37 respectively. The combiner members 35 and 37 are supported at their side edges as aforesaid and for this purpose the top links 25, their extensions 25' and the second further link elements 33 having channels to receive the side edges.

The display head 11 as described above is shown in FIG. 1 in the operative position.

When the display provided by the display head 11 is not required for viewing the image combiner arrangement 15 may be rotated forwardly into a stowed position, as shown in FIGS. 2 and 3, bringing the combiner members 35, 37, the struts 21, 23, the top links 25, the extensions 23', 25' and the further links 31, 33 more nearly parallel to one another, alongside the top and side surfaces of the projector housing 17, where they do not present any obstruction to the user or his view of the distant forward scene.

Referring now also to FIGS. 5, 6 and 7, located within a slot in one of the struts 21, there is a catch member 41 which is pivotal about an axis P with respect to the strut 21. A spring loaded plunger 43 arranged to travel along a blind passage formed within and along the length of the strut 21 projects into the slot and therefore engages the catch member 41. The surface of the catch member 41 engaged by the plunger 43 includes two spaced apart indentations 45a and 45b. The catch member 41 includes a manual tab 51 by which it may be pivoted about the axis P so as to cause the plunger 43 to engage either of the two spaced apart indentations 45a, 45b. As the catch member 41 pivots about the axis P a nose portion 53 of the catch member 41 moves accordingly.

A detent plate 47 is fixed parallel to and adjacent the side of the housing 17 so that it lies between the strut 21 and the side of the housing 17. The plate 47 is in the form of a sector of a circle and has two spaced apart indentations 49a and 49b in its arcuate edge. The position and orientation of the plate 47 determine the position of the strut 21 when the combiner arrangement 15 is in the operative and stowed positions. When the combiner arrangement 15 is in the operative position operation of the manual tab 51 to cause the plunger 43 to engage the indentation 45a results in the nose portion 53 engaging the indentation 49a and secures the combiner arrangement in its operative position. Subsequent operation of the manual tab 51 to cause the plunger 43 to engage the indentation 45b removes the nose portion 53 from the indentation 49a and enables the combiner arrangement 15 to be moved from the operative to the stowed position. With the combiner arrangement in the stowed position operation of the manual tab 51 to cause the plunger 43 to engage the indentation 45a results in the nose portion 53 engaging the indentation 49b.

It will be appreciated that although the embodiment of the invention described above by way of example utilises a double plate combiner, that the invention may also be used with a single plate combiner. Similarly, alternative catch arrangements to secure the combiner arrangement in its stowed and operative positions may, of course, be used.

We claim:

1. A display head, for a head-up display system, comprising:
   (A) an optical projector;
   (B) a housing for said projector, said housing having a surface and fore and aft ends;
   (C) an image combiner; and
   (D) means for supporting the image combiner so that the combiner is movable between a stowed position and an operative position wherein the optical projector projects light representing a display onto the image combiner for reflection thereby to provide a user with an image of the display superimposed in a view of a scene through the combiner in a given viewing direction, said support means including two substantially identical four element kinematic chains spaced apart in a direction transverse to said viewing direction, each chain having:
   (i) a first element fixed to said housing and, hence, with respect to said optical projector,
   (ii) second and third elements pivotally connected to said first element respectively at fore and aft positions with respect to said viewing direction, said fore and aft positions being respectively intermediate between the fore and aft ends of said housing with respect to the viewing direction and adjacent the aft end of said housing, and (iii) a fourth element pivotally connected to said second and third elements rspectively at fore and aft positions with respect to said viewing direction and which carries and is fixed to at least part of said combiner, (E) each pair of fore and aft positions in the said two chains sharing a respective common axis and, on movement from the operative position to the stowed position, said combiner and said elements become substantially parallel to each other so that in the stowed position said combined and said elements lie alongside the surface of said housing.

2. A display head according to claim 1 wherein in each kinematic chain the distance along the first element between the pivotal connections between the second and third elements and the first element is greater than the distance along the fourth element between the pivotal connections between the second and third elements and the fourth element and wherein in each kinematic chain the distance along the second element between the pivotal connections between the second element and the first and fourth element is less than the distance along the third element between the pivotal connections between the third element and the first and fourth elements.

3. A display head according to claim 1 further including tie means rigidly connected between and to the said two kinematic chains.

4. A display head according to claim 3 wherein said tie means comprise at least one torsionally stiff spindle, each said spindle extending coaxially with a respective said common axis between the said second and first or between the said third and first elements.

5. A display head according to claim 1 further including catch means for selectively securing said image combiner and support means either in the operative or the stowed position.

6. A display head, for a head-up display system, comprising:

(A) an optical projector;

(B) a housing for said projector, said housing having a surface and fore and aft ends;

(C) an image combiner;

(D) means for supporting the image combiner so that the combiner is movable between a stowed position and an operative position wherein the optical projector projects light representing a display onto the image combiner for reflection thereby to provide a user with an image of the display superimposed on a view of a scene through the combiner in a given viewing direction, said support means including two substantially identical four element kinematic chains space apart in a direction transverse to said viewing direction, each chain having:

(i) a first element fixed to said housing and, hence, with respect to said optical projector, (ii) second and third elements pivotally connected to said first element respectively at fore and aft positions with respect to said viewing direction, said fore and aft positions being repectively intermediate between the fore and aft ends of said housing with respect to the viewing direction and adjacent the aft end of said housing, (iii) a fourth element pivotally connected to said second and third elements respectively at fore and aft positions with respect to said viewing direction and which carries and is fixed to at least part of said combiner, (iv) said fourth element having a first rigid extension, and (v) said third element having a second rigid extension;

(E) said support means further including a first further element pivotally connected to said first rigid extension, and a second further element pivotally connected to said second rigid extension, said first further element and said second further element being also pivotally connected to each other so that said first and second rigid extensions and said first and second further elements together form a parallel motion linkage pivotally connected to each chain at the pivotal connection between said fourth and third elements, said second further elements carrying a further part of said combiner; and (F) each pair of fore and aft positions in the said two chains sharing a respective common axis and, on movement from the operative position to the stowed position, said combiner and said elements become substantially parallel to each other so that in the stowed position said combiner and said elements lie alongside the surface of said housing.

* * * * *